(12) United States Patent
Vannan et al.

(10) Patent No.: US 7,083,695 B2
(45) Date of Patent: Aug. 1, 2006

(54) TIRES WITH NON-BLACK TREAD GROOVES

(75) Inventors: Frederick F. Vannan, Clinton, OH (US); Ramendra N. Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 371 days.

(21) Appl. No.: 10/326,428

(22) Filed: Dec. 19, 2002

(65) Prior Publication Data

US 2004/0118496 A1    Jun. 24, 2004

(51) Int. Cl.
    *B29D 30/58*     (2006.01)
    *B60C 1/00*      (2006.01)
    *B60C 11/00*     (2006.01)
    *B60C 11/03*     (2006.01)

(52) U.S. Cl. .............................. 156/128.1; 152/209.5; 152/209.18; 152/DIG. 12; 156/128.6; 156/230

(58) Field of Classification Search ................ 156/116, 156/123, 128.1, 230, 128.6; 152/154.2, 209.5, 152/209.18, DIG. 12

See application file for complete search history.

(56) References Cited

U.S. PATENT DOCUMENTS

| | | | | |
|---|---|---|---|---|
| 3,833,040 | A * | 9/1974 | Bins ........................ | 152/209.5 |
| 4,106,965 | A * | 8/1978 | Lee ............................ | 156/123 |
| 4,804,028 | A * | 2/1989 | Botzman .................... | 152/525 |
| 4,816,095 | A * | 3/1989 | Taylor ........................ | 156/96 |
| 4,955,690 | A * | 9/1990 | Bacon, Jr. .................... | 359/540 |
| 5,527,407 | A * | 6/1996 | Gartland et al. ............ | 156/116 |
| 5,645,660 | A   | 7/1997 | Attinello et al. ............ | 152/523 |
| 5,885,386 | A   | 3/1999 | Makinson et al. .......... | 152/523 |
| 5,904,792 | A   | 5/1999 | Majumdar et al. .......... | 156/128 |
| 5,904,794 | A   | 5/1999 | Boissonnet et al. ......... | 156/230 |
| 5,942,069 | A   | 8/1999 | Gerresheim et al. ...... | 156/128.1 |
| 5,980,668 | A   | 11/1999 | Slingluff ................... | 156/110.1 |
| 6,080,465 | A   | 6/2000 | Boissonnet et al. ......... | 428/139 |
| 6,235,376 | B1 * | 5/2001 | Miyazaki et al. ........... | 428/203 |
| 6,238,760 | B1  | 5/2001 | Majumdar et al. ......... | 428/40.1 |
| 6,561,244 | B1 * | 5/2003 | Zanzig et al. ............ | 152/209.5 |
| 2002/0100528 | A1 | 8/2002 | Sandstrom et al. ......... | 152/210 |
| 2002/0143095 | A1 | 10/2002 | Zanzig et al. ............... | 524/492 |
| 2002/0144761 | A1 | 10/2002 | Zanzig et al. ............ | 152/209.5 |
| 2002/0147257 | A1 | 10/2002 | Zanzig et al. ............... | 524/128 |
| 2004/0103967 | A1 * | 6/2004 | Majumdar et al. .......... | 156/123 |
| 2004/0103974 | A1 * | 6/2004 | Majumdar et al. ........ | 156/110.1 |
| 2004/0108035 | A1 * | 6/2004 | Majumdar ............... | 152/209.6 |

FOREIGN PATENT DOCUMENTS

| CA | 2212021 | * | 7/1998 |
| DE | 9102607 | * | 7/1991 |
| EP | 0 249 918 A2 | | 12/1987 |
| EP | 510550 | * | 10/1992 |
| EP | 691223 | * | 1/1996 |

(Continued)

OTHER PUBLICATIONS

Machine translation for EP 510550.*

(Continued)

*Primary Examiner*—Steven D. Maki
(74) *Attorney, Agent, or Firm*—Wood, Herron & Evans, LLP

(57) ABSTRACT

A pneumatic tire comprising a black colored tread with at least one colored groove wherein the top surface of the tread designed to be ground-contacting is essentially free of non-black color. A non-black component is placed over the tread strip and covered with a thermoformable film prior to forming the groove pattern. After vulcanization, the film is removed, and the tread lugs buffed free of color, if necessary, thereby forming a tire having color localized in the tread grooves.

7 Claims, 16 Drawing Sheets

FOREIGN PATENT DOCUMENTS

| | | | |
|---|---|---|---|
| EP | 713901 | * | 5/1996 |
| JP | 61-146605 | * | 7/1986 |
| JP | 3-54004 | * | 3/1991 |
| JP | 08-318715 | * | 12/1996 |
| JP | 2002-192624 | * | 7/2002 |
| WO | WO 99/01299 | | 1/1999 |

OTHER PUBLICATIONS

Machine translation for 713901.*

*Michelin brings out colors*, Rubber & Plastics News, Aug. 11, 1997, 1 pp.

Jeff Yip, *BFG'S colored tires ripped for ties to gangs*, Rubber & Plastics News, Aug. 23, 1999, 2 pp.

Jeff Yip, *"Scorcher" ban sought in San Francisco*, Tire Business, Oct. 11, 1999, 2 pp.

Mike McNulty, *Michelin to add custom Scorchers to year's mix*, Rubber & Plastics News, Jan. 24, 2000, 1 pp.

eTires.com, Inc., *Tire Catalog, BFGoodrich Tires 205/40R16 B F Goodrich Scorcher T/A Reinforced Yellow*, From website http://www.etires.com/tireSpec.jsp?specID=3027, © 2000 eTires.com, Inc., printed Oct. 22, 2002, 1 pp.

* cited by examiner

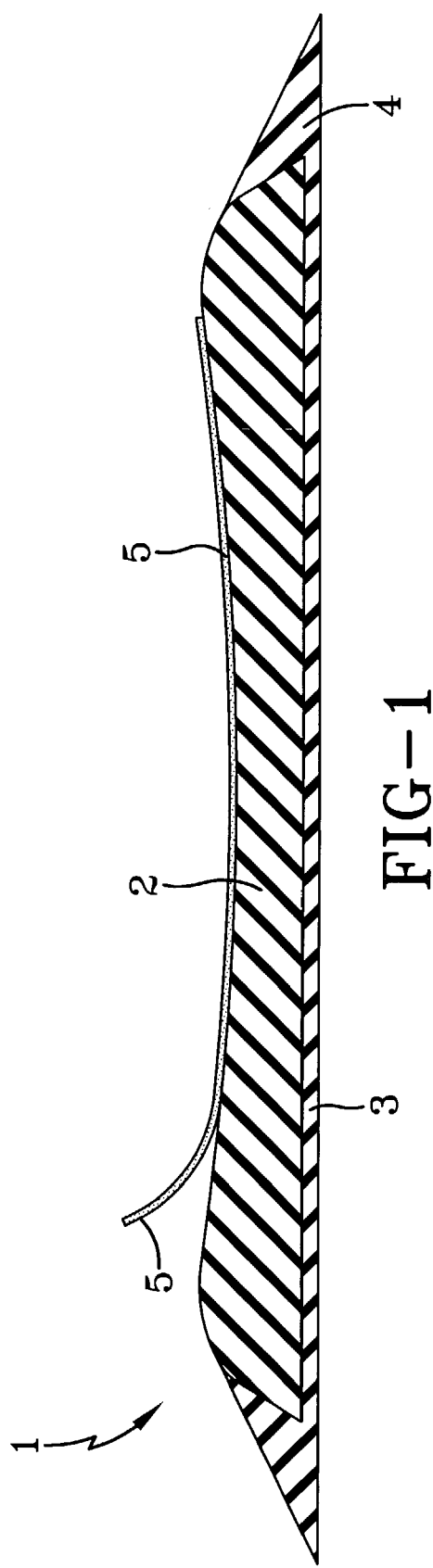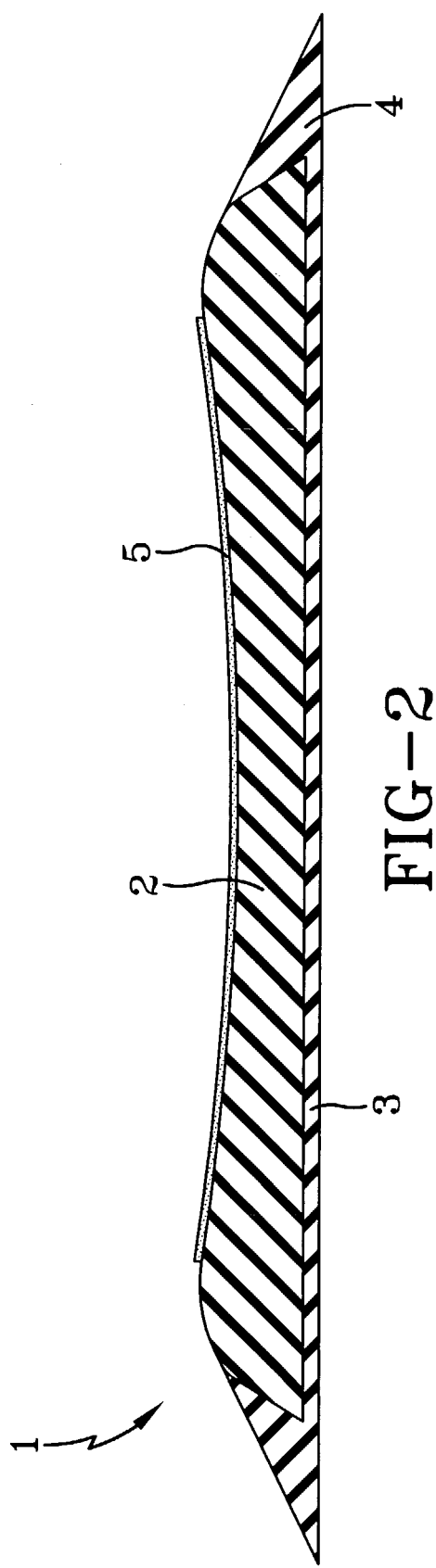

TIRES WITH NON-BLACK TREAD GROOVES

FIELD OF THE INVENTION

This invention relates to pneumatic tires having black treads and non-black tread grooves and a method for manufacturing.

BACKGROUND OF THE INVENTION

While some improvements in the pneumatic tire art are directed to the physical properties of the tires, other improvements are driven by a desire to enhance the appearance and marketability of the tire product or to improve safety by enhancing nighttime visibility. For example, numerous improvements have related to placing numerals, letters, characters or other indicia on the black sidewalls of rubber tires. The interest displayed by customers in the aesthetic appearance of automobiles, including the tires, has also resulted in the placement of colored portions on the tire sidewalls, such as white sidewall tires. Most recently, tire manufacturers have introduced colored treads, for instance the B. F. Goodrich Scorcher™, which has colored treads that refresh as the tire wears. These colored tires generally cost an additional $50–$80 per tire over the price of an all black tire. Original equipment (OE) manufacturers are now expressing an interest in tires with colored treads because of their unique aesthetic appearance or better nighttime visibility. However, the colored tread tires have been criticized because they leave undesirable markings on roads and driveways. This unintended color transfer may be particularly objectionable where roads have intentional colored markings designed to aid or control vehicular traffic patterns.

While most tires have a tread strip almost exclusively comprising a rubber composition that contains carbon black, and is therefore black in color, it would be desirable to provide a pneumatic tire that provides color for the aesthetic pleasure of consumers and to improve nighttime visibility, but that does not transfer color from the tire to roads and driveways. It is further desirable to provide a method of manufacture for such tires that does not add significant time or cost to the tire assembly process and is relatively simple to implement.

SUMMARY OF THE INVENTION

The present invention provides an aesthetically pleasing pneumatic tire with better nighttime visibility in which color is localized in the tread grooves to prevent color markings on roads and driveways. Thus, the black tread strip of the pneumatic tire includes a top surface designed to be ground-contacting that is black in color and a pattern of grooves each defining a recessed surface with at least a substantial portion of the recessed surface of at least one groove being non-black in color. The pattern of grooves may include a plurality of circumferential grooves and/or lateral grooves, for example, with either or both including a non-black color component on the recessed surfaces of the grooves. The non-black component thus extends over at least a portion of at least one visible non-ground-contacting surface and does not extend over any ground-contacting tread.

The present invention further provides a method of making pneumatic tires having at least one non-black tread groove. The uncured tire is assembled and a non-black component is placed over at least a portion of the outer surface of the uncured tread strip of the tire assembly, either before the tread strip is added to the assembly, at the tire building drum, or after the uncured tire is built. Advantageously, a thermoformable film is placed over the non-black component to prevent staining thereof. The pattern of non-black grooves is then formed in the uncured tread strip with the non-black component and thermoformable film conforming to the pattern as it is formed. The tire assembly is then cured (vulcanized). The thermoformable film is then removed, if present, thereby exposing the non-black component. Any portion of the non-black component that exists on the ground-contacting top surface of the treads is removed, such as by buffing. Buffing or other means of removal may be minimized by applying the non-black component to the uncured tread strip in a pattern that corresponds to the pattern of non-black grooves that will be formed in the tread strip.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 depicts a cross-sectional view of an extruded tread strip prior to assembling it onto a tire carcass and further depicting the placement of a non-black component on the tread strip.

FIG. 2 depicts the tread strip of FIG. 1, with the non-black component in place.

DEFINITIONS

Figure 3:
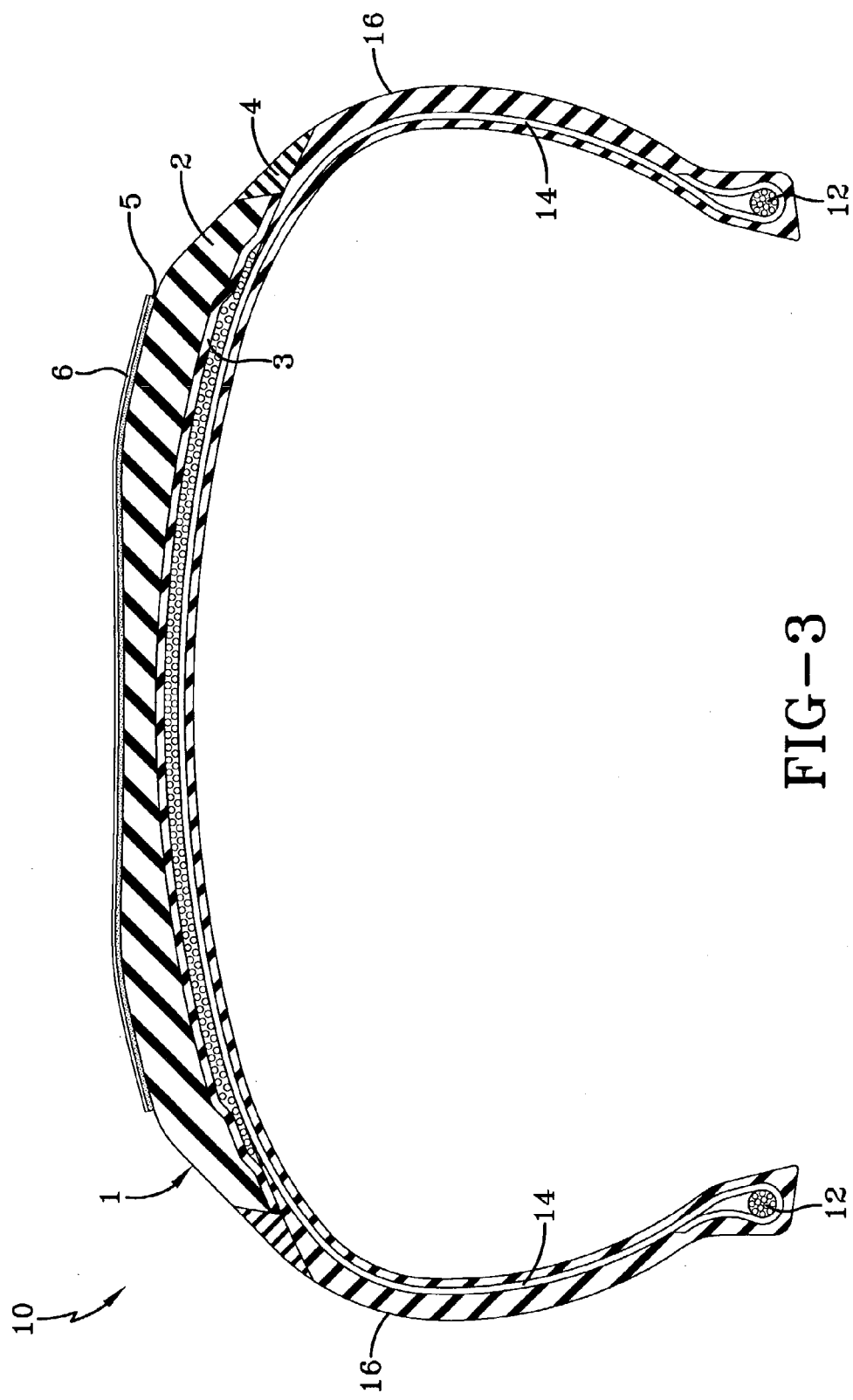
FIG. 3 is a cross-sectional view of an uncured tire assembly including the tread strip of FIG. 2 with thermoformable film thereon prior to shaping and curing of the assembly.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Equatorial plane (EP)" means the plane perpendicular to the tire's axis of rotation and passing through the center of its tread.

"Groove" means an elongated void area in a tread that may extend circumferentially or laterally about the tread in a straight, curved, or zig-zag manner. Grooves ordinarily remain open in the tire footprint, and form a recessed surface in the tread. Circumferentially and laterally extending grooves sometimes have common portions and may be sub-classified as "wide" or "narrow". Grooves may be of varying depths in a tire.

"Lugs" refer to discontinuous radial rows of tread rubber in direct contact with the road surface.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Sidewall" means that component which comprises a portion of the outside surface of a tire between the tread and the bead.

"Tread" means a molded rubber component which, when bonded to a tire casing, includes that portion of the tire that comes into contact with the road when the tire is normally inflated and under normal load.

The terms "compound", "compounded rubber" and "rubber composition" are intended to be interchangeable terms unless otherwise noted.

The terms "cure" and "vulcanize" are intended to be interchangeable terms unless otherwise noted.

The terms "green" and "uncured" are intended to be interchangeable unless otherwise noted. However, the term "uncured" is generally used herein to avoid confusion between the term "green" as a color and the term "green" as an uncured state.

The term "non-black" refers to any color including white but excluding black, wherein black is generally achieved by the presence of carbon black in the rubber composition and non-black is generally achieved by the absence of carbon black.

DETAILED DESCRIPTION

With reference to FIG. 1, a cross-sectional view of a tire tread strip 1 is shown, conventionally comprising a tread cap layer 2 and a tread base layer 3 together with co-extruded tread wings 4. In accordance with the present invention, a non-black component 5 is applied on the cap layer 2 of the tread strip 1. As further shown in FIG. 2, the non-black component 5 conforms to the surface of the tread strip 1.

FIG. 3 depicts a cross-sectional view of an uncured tire assembly 10 including the tread strip 1 of FIG. 2. The overall construction of the uncured tire assembly 10 is not part of the invention, although it will be described here in order to provide an explanation of the general environment in which the invention operates. The uncured tire assembly 10 includes a pair of annular bead portions 12 and at least one carcass ply 14 wrapped around the beads 12. The tread strip 1 is disposed radially outwardly of the carcass ply 14. A pair of sidewalls 16 extend radially inwardly from the tread strip 1 along outer surfaces of the carcass ply 14 toward the bead portions 12. At the tire building machine (not shown), a thermoformable film 6 is placed over the non-black component 5. In the embodiments depicted in FIGS. 1–3, the non-black component 5 was placed on the tread strip 1 prior to building the tire assembly 10 at a tire building machine (not shown), and the thermoformable film 6 was placed on the tread 1 at the tire building machine. However, it may be understood that the tread strip 1 may first be added to the tire assembly 10, followed by placement of the non-black component 5 and thermoformable film 6 at the tire assembly machine, which non-black component 5 and thermoformable film 6 may in certain embodiments comprise a single component referred to as a color transfer film 5, 6. Alternatively, the non-black component 5 may be placed on the tread strip 1 prior to building the tire assembly 10 or at the tire building machine and the thermoformable film 6 may be placed over the non-black component 5 after the assembly 10 is removed from the tire building machine.

In a typical tire building process, the tire assembly 10 is inflated and deflated to test the construction for initial failures. The tire assembly 10 is then placed into a mold (not shown) with the tread strip 1 positioned to abut a mold surface having a pattern therein corresponding to the desired tread groove pattern for the particular tire to be manufactured. A curing bladder is placed adjacent the interior of the tire assembly 10 and expanded to force the tread strip 1 against the mold surface thereby forming the tread pattern in the uncured tread strip 1. The mold surface may, and often does, contain staining ingredients present from previous tire curing operations, and the presence of the thermoformable film 6 protects the non-black component 5 from being discolored by the staining ingredients. However, if the non-black component 5 is stain resistant, then the thermoformable film may be unnecessary. After shaping the tread, the tire assembly 10 is then cured or vulcanized in the mold to permanently set the tread pattern. This overall process is referred to as shaping and curing.

Figure 4:
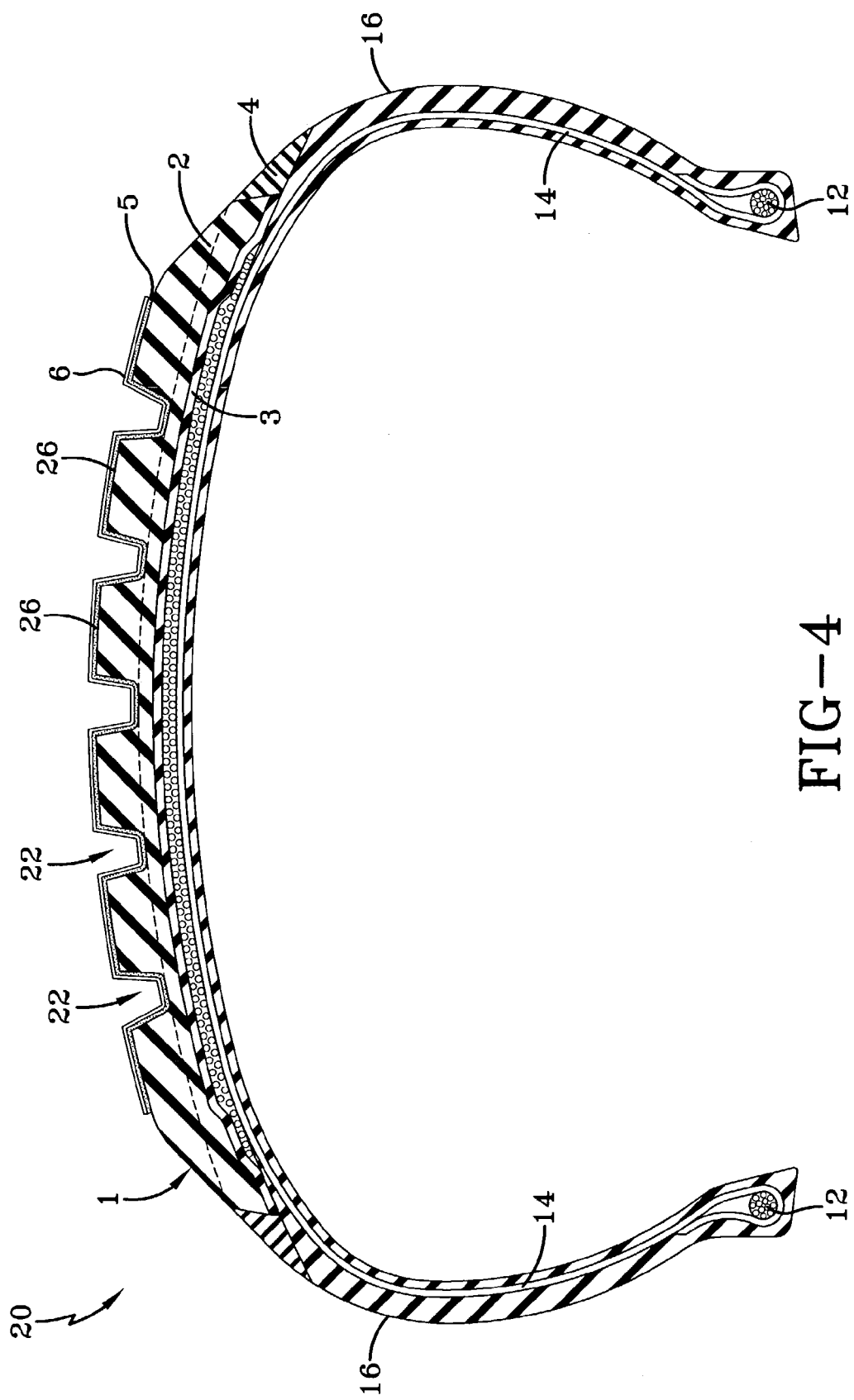
FIG. 4 is a cross-sectional view of the tire assembly of FIG. 3 after shaping and curing.
Figure 4A:
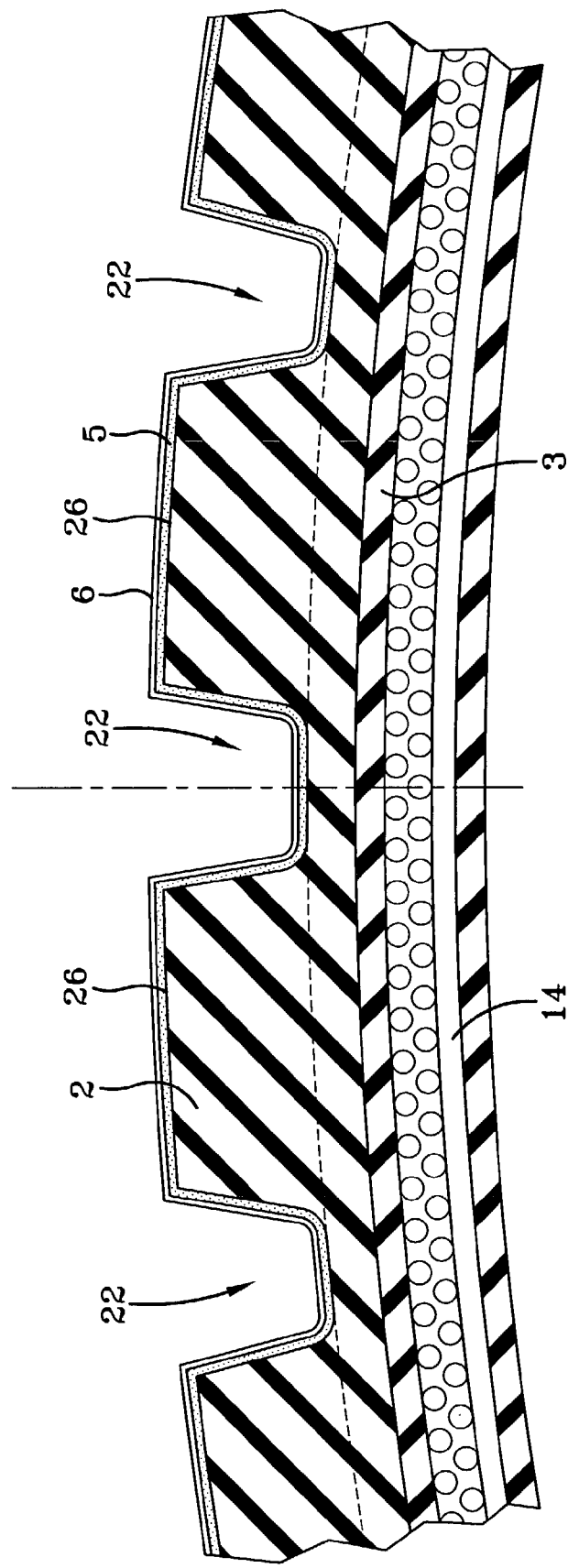
FIG. 4A is an enlarged cross-sectional view of a portion of the tire assembly of FIG. 4.
Figure 5:
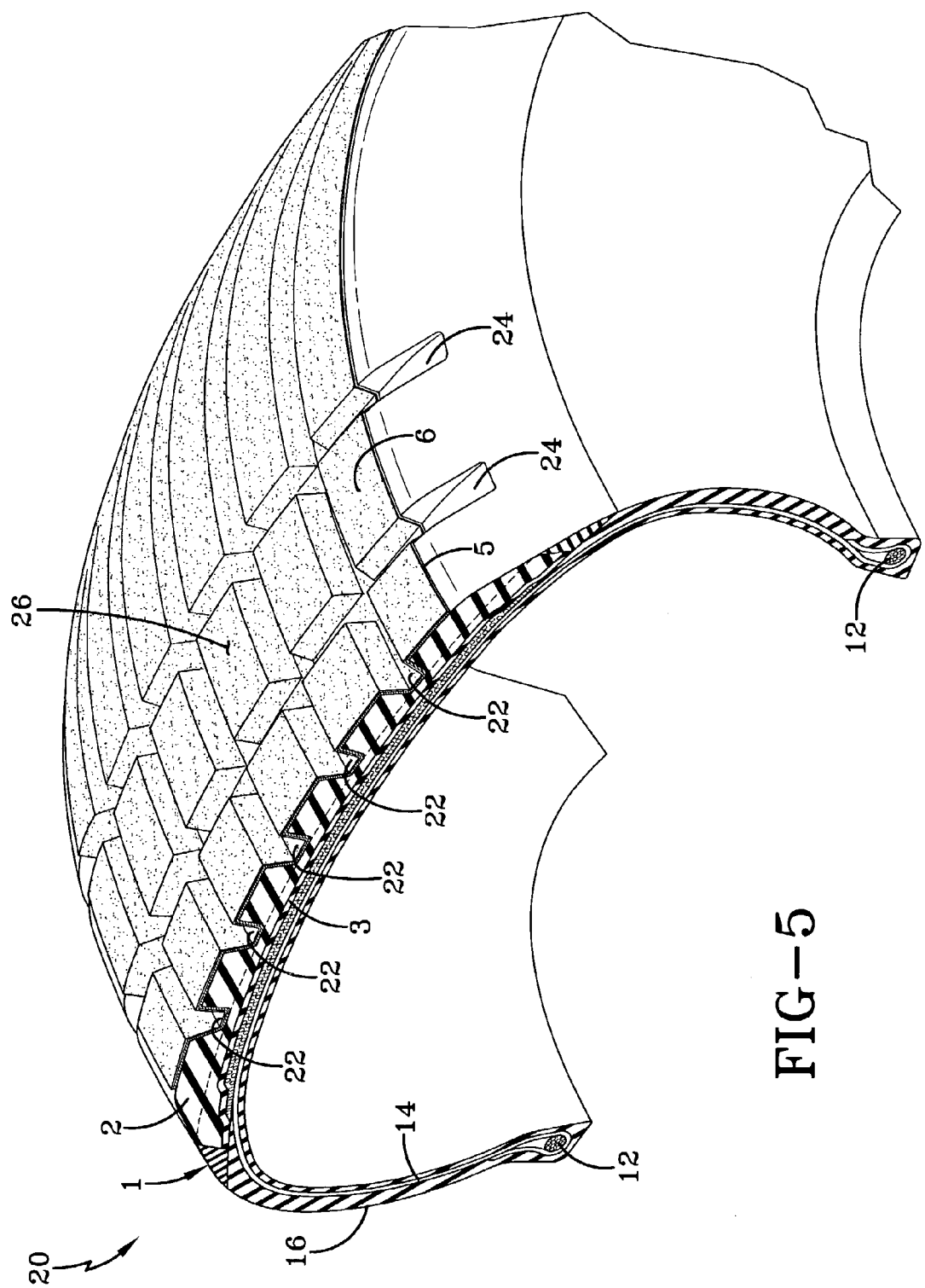
FIG. 5 is a perspective view depicting the tire tread of FIG. 4.

A shaped and cured tire assembly 20 is depicted in cross-section in FIG. 4 and in perspective view in FIG. 5. The particular tread pattern for this cured tire assembly 20, includes five circumferential grooves 22 and a plurality of lateral grooves 24, two of which are depicted in FIG. 5. However, it may be understood that the invention is not limited to any particular tread pattern. The pattern of grooves 22, 24 define recessed surfaces, and the non-black component 5 and thermoformable film 6 conform to the recessed surfaces. The top surface 26 of tread strip 1, which is not recessed by forming the pattern of grooves therein, is designed to be ground-contacting when the tire is in operation. This top surface 26 is also referred to as the lug portion of the tread. In the embodiment depicted in FIGS. 1–7, the non-black component 5 and thermoformable film 6 are placed over essentially the entire tread strip 1 such that during formation of the pattern of grooves 22, 24, the non-black component 5 and thermoformable film 6 conform to the recessed surfaces of the grooves 22, 24, as well as to the top surface 26 (lugs) of the tread strip 1, as further shown in enlarged cross-section in FIG. 4A.

Figure 5A:
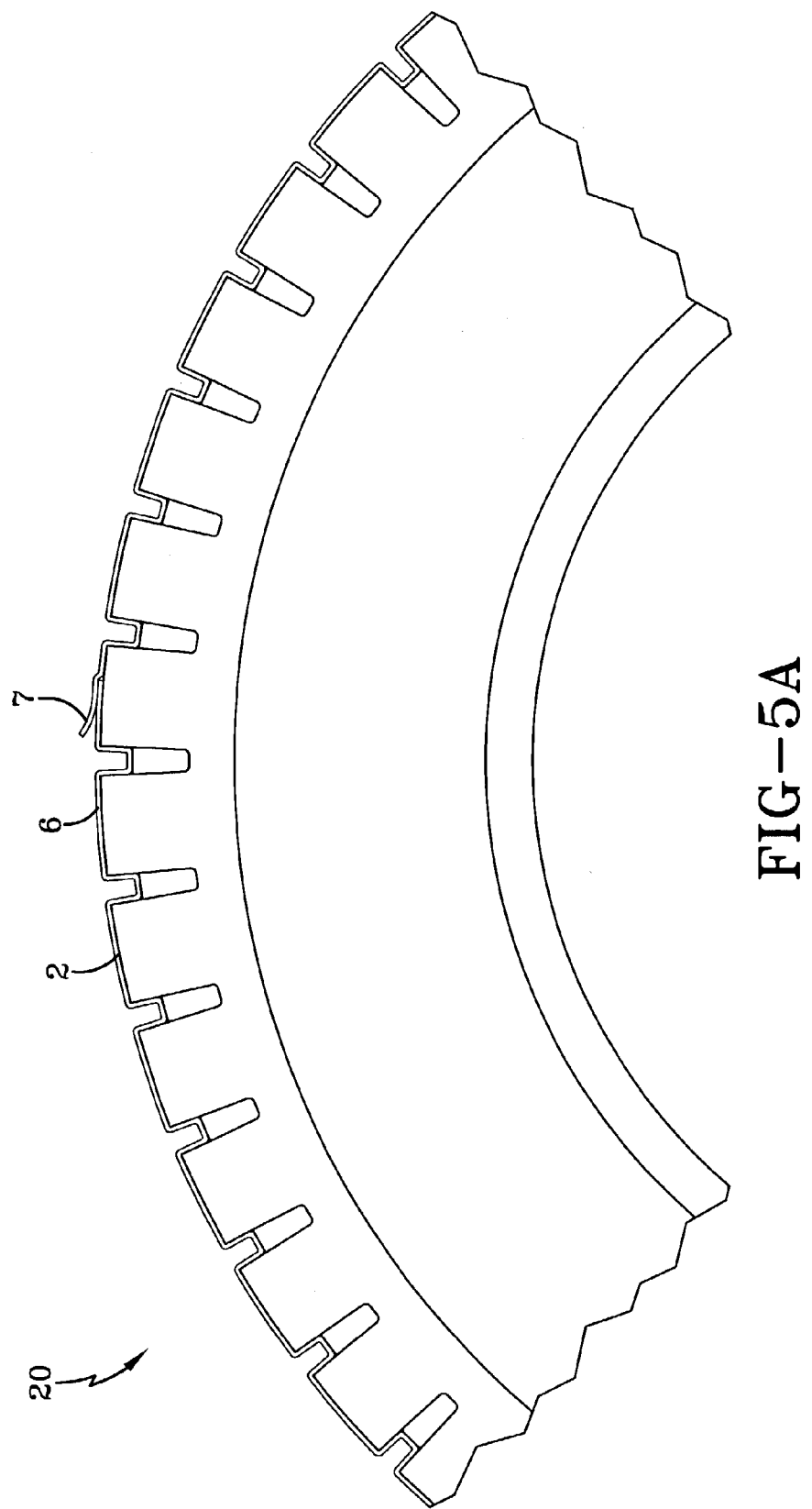
FIG. 5A is a side view of a tire assembly depicting a pull tab for removing the thermoformable film.

In an exemplary embodiment, depicted schematically in side view in FIG. 5A, the thermoformable film 6 is placed over the tread cap layer 2 around the entire circumference of tire assembly 10 and overlapped such that, after shaping and curing, a pull tab 7 exists on the tread strip 1.

Figure 6:
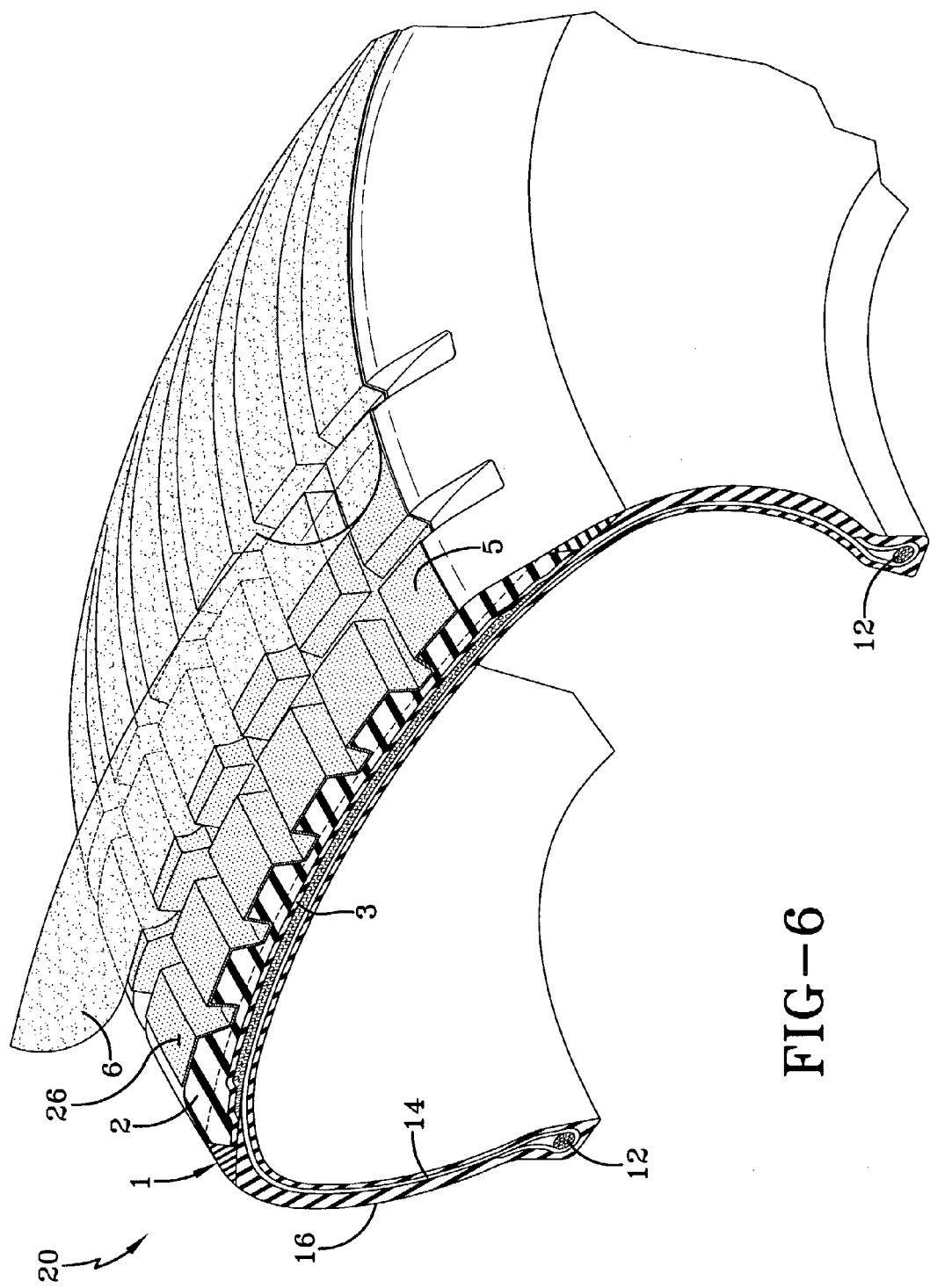
FIG. 6 is a perspective view depicting the removal of the thermoformable film to expose the non-black component.
Figure 7:
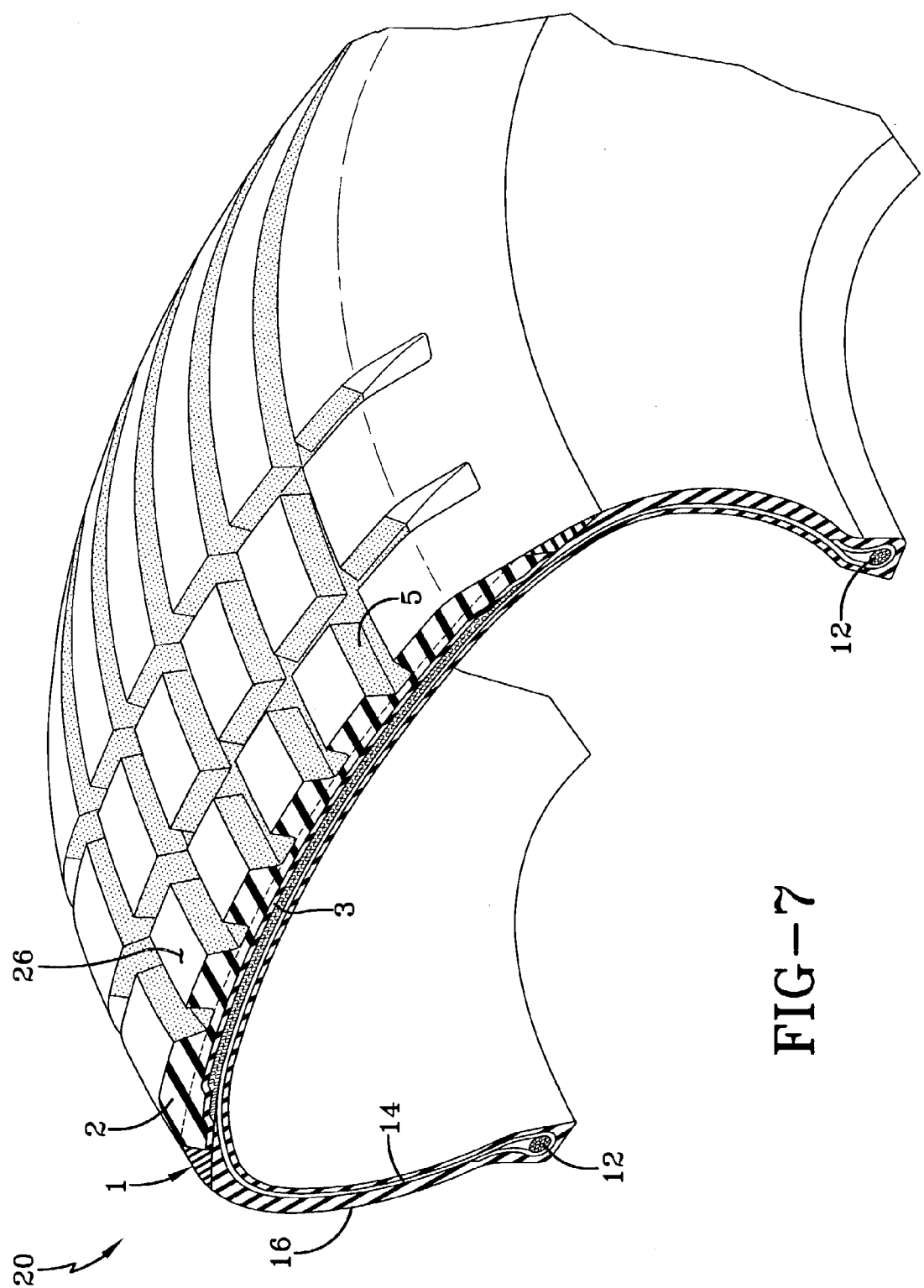
FIG. 7 is a perspective view depicting the non-black component localized in the tread grooves and absent from the ground-contacting surfaces of the tire tread.
Figure 8:
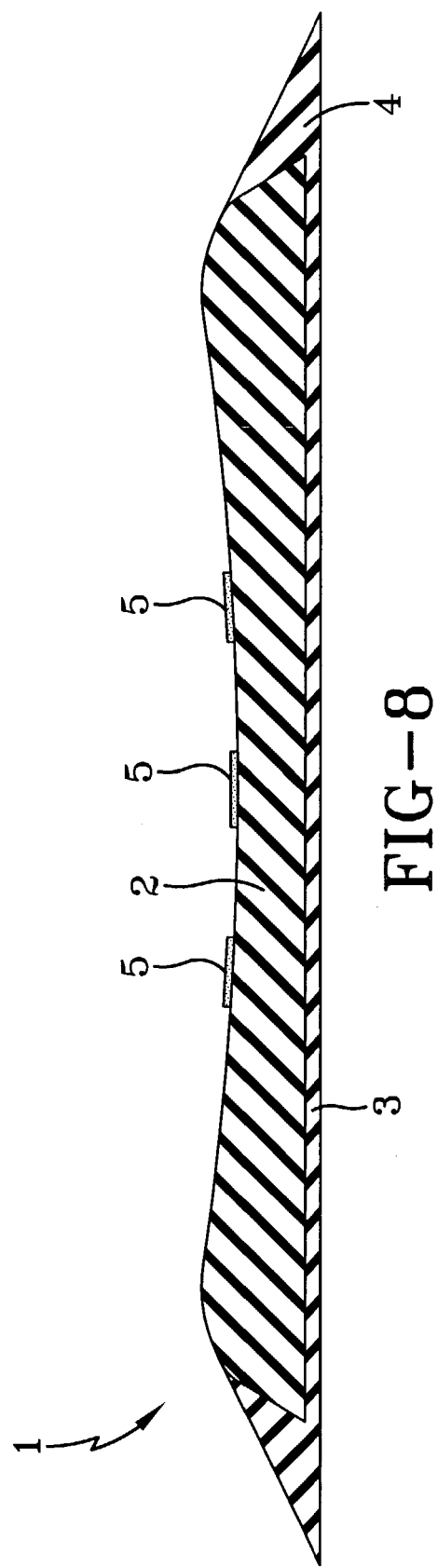
FIG. 8 is a cross-sectional view of a tread strip depicting an alternative placement of the non-black component in the form of strips in a pattern ultimately corresponding to the location of certain tread grooves.

After the uncured tire assembly 10 is shaped and cured to form cured tire assembly 20, the thermoformable film 6 is removed, as depicted in FIG. 6, thereby revealing the non-black component 5 on the ground-contacting top surface 26 and in the grooves 22, 24. Pull tab 7 simplifies the removal of the thermoformable film 6. The non-black component 5 is then removed from the ground-contacting top surface 26, thereby localizing the non-black component 5 within the recessed grooves 22, 24, which define non-ground-contacting surfaces. The non-black component 5 may be removed by buffing the component 5 from the surface 26. Buffing techniques, for example using a lathe-type machine, are well known in the industry. The resultant tire 20 having localized color in the tread grooves 22, 24 is shown in FIG. 7.

Figure 9:
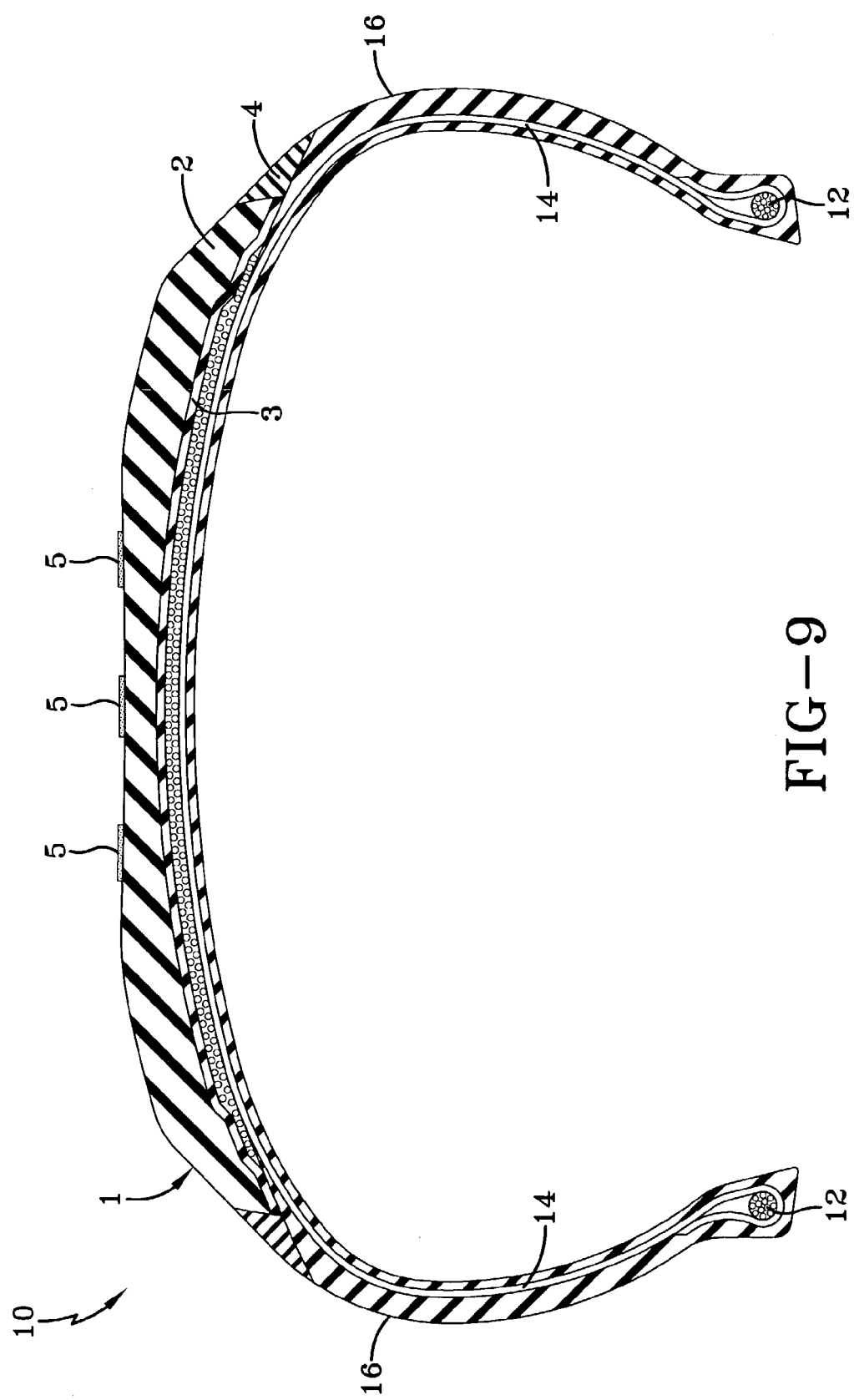
FIG. 9 is a cross-sectional view of a tire assembly including the tread strip of FIG. 8 prior to shaping and curing.
Figure 9A:
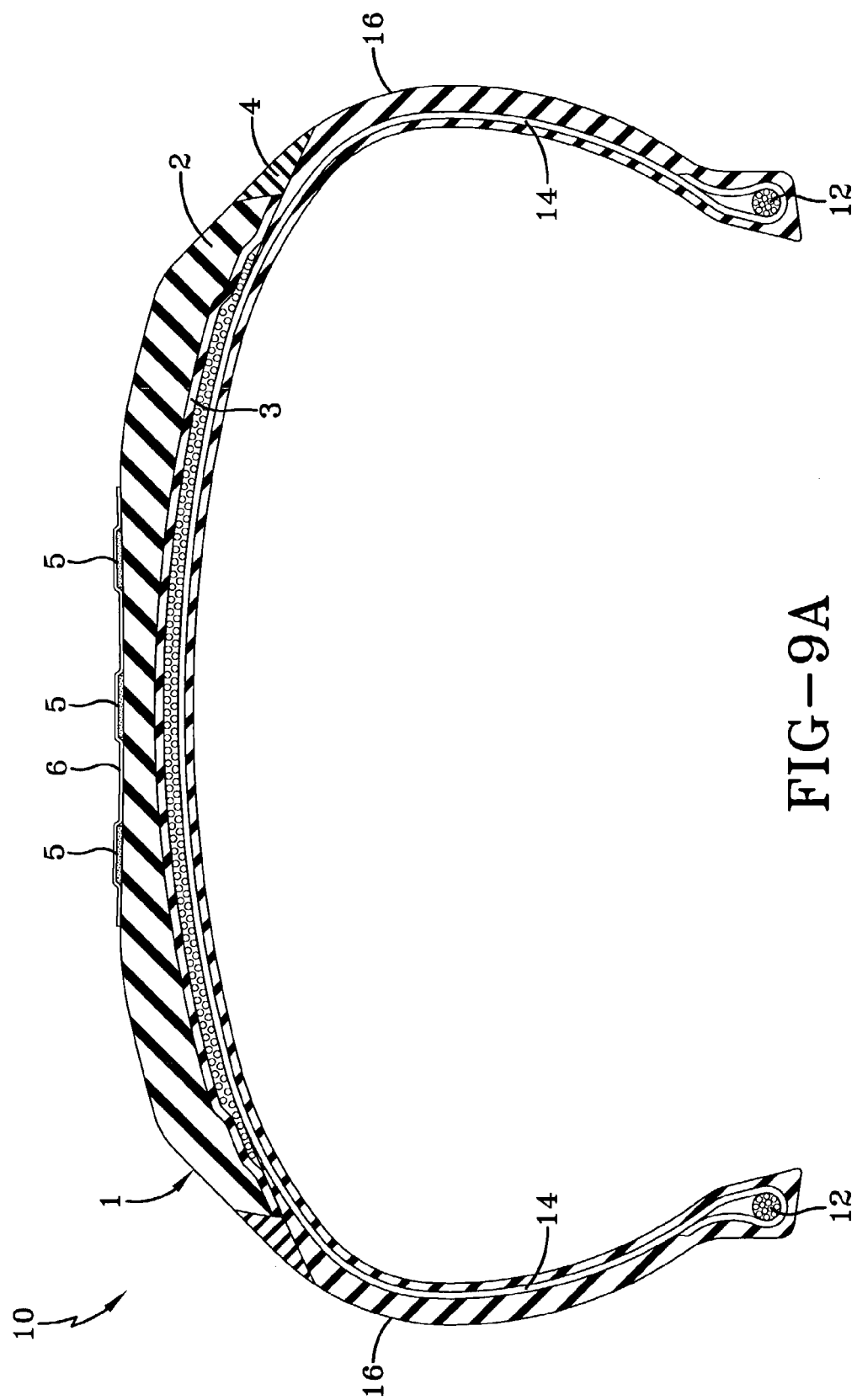
FIG. 9A is a cross-sectional view of an alternative embodiment of a tire assembly including a thermoformable film over the tread strip covering the non-black component strips.

An alternative method for manufacturing a tire 20 is shown in FIGS. 8–12. As specifically shown in FIG. 8, strips of non-black component 5 are placed over portions of the tread strip 1 in a pattern corresponding to the pattern of non-black recessed circumferential grooves 22 to be formed in the tread strip 1. The strip 1 is then assembled into the uncured tire assembly 10, as shown in FIG. 9, at the tire building machine (not shown), though it may be understood that the tread strip 1 may be assembled first, followed by placement of the strips of non-black component 5 at the tire building machine. If desirable or necessary, thermoformable film 6 may be placed on the tread strip 1 to cover the strips of non-black component 5, as depicted in FIG. 9A. The thermoformable film 6 prevents staining of the non-black component 5 from the mold (not shown), which may contain staining ingredient contamination present from prior tire curing operations. However, if the non-black component 5 is stain resistant, then the thermoformable film 6 may be unnecessary.

Figure 10:
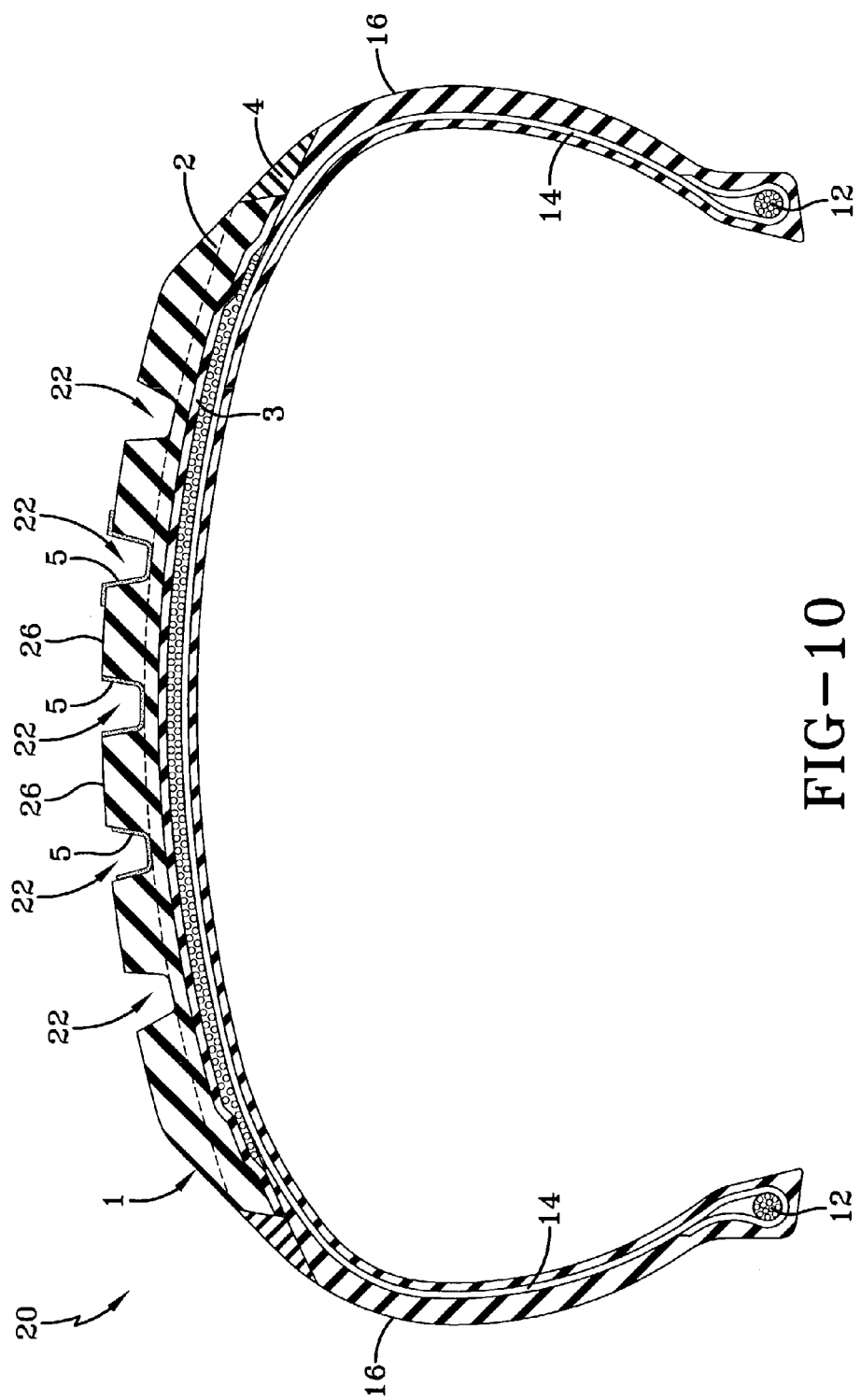
FIG. 10 is a cross-sectional view of the assembly of FIG. 9 after shaping and curing.
Figure 10A:
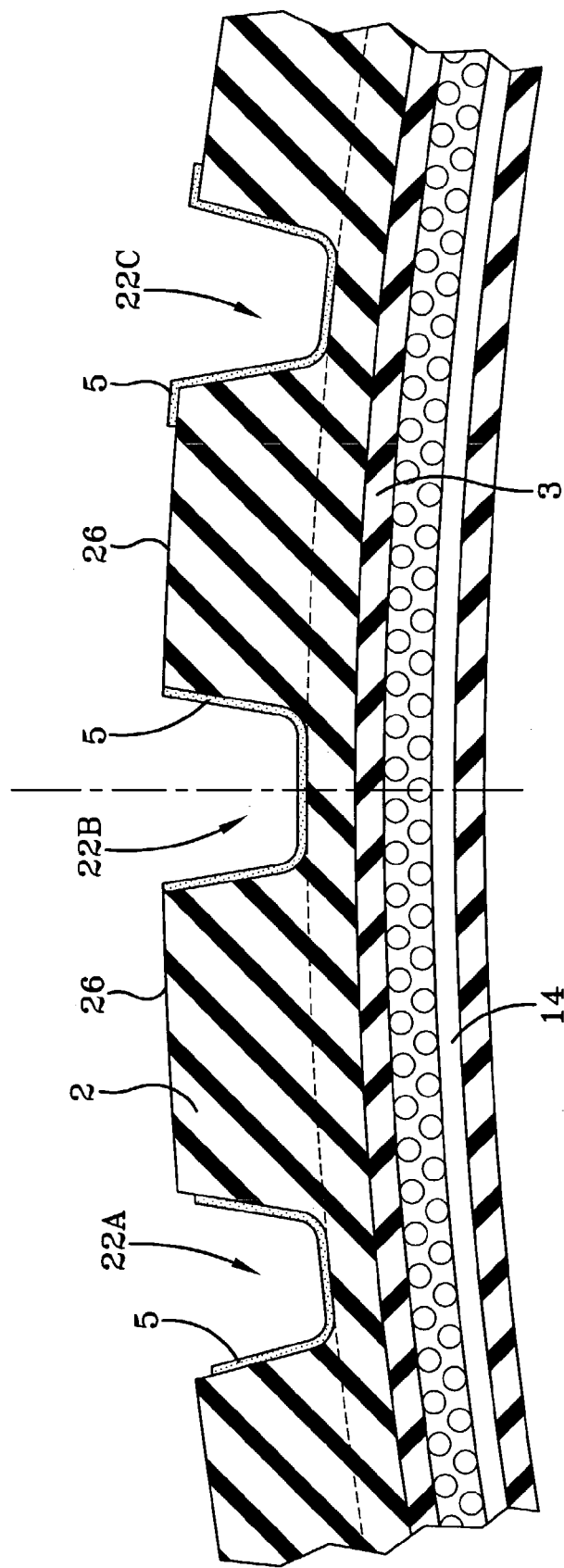
FIG. 10A is an enlarged cross-sectional view of a portion of the tire assembly of FIG. 10.
Figure 10B:
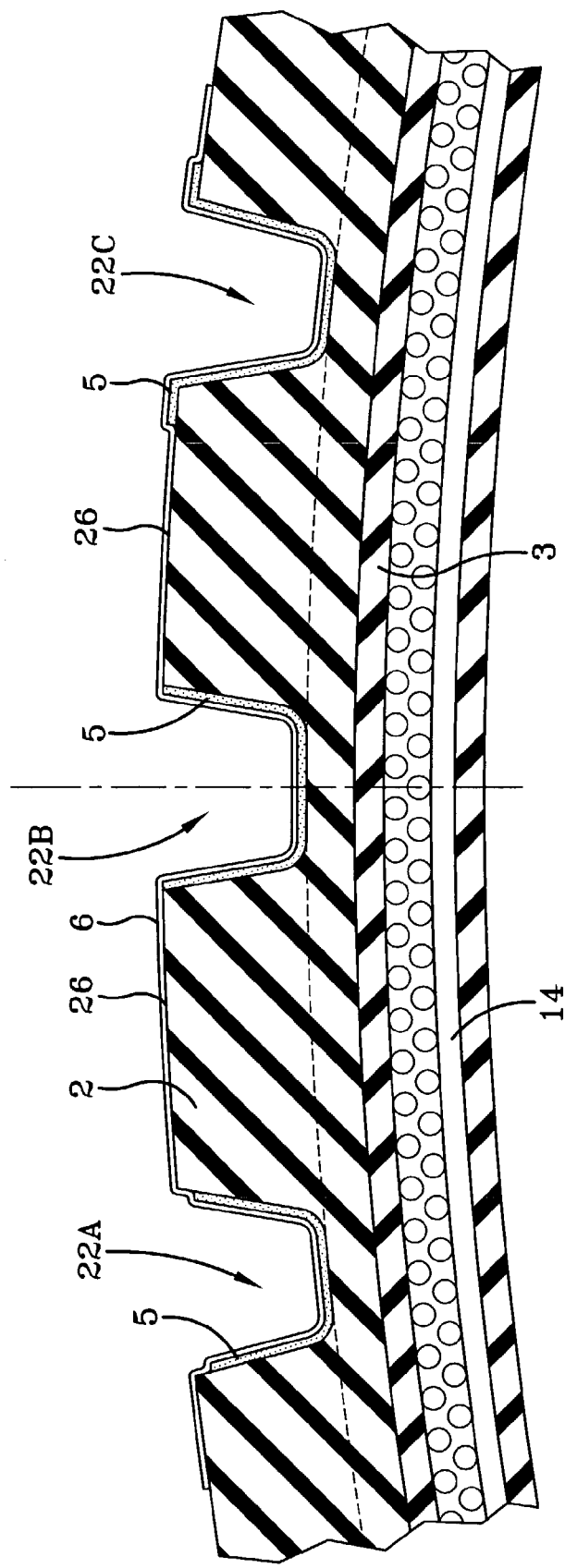
FIG. 10B is an enlarged cross-sectional view of a portion of the tire assembly of FIG. 9A after shaping and curing.
Figure 11:
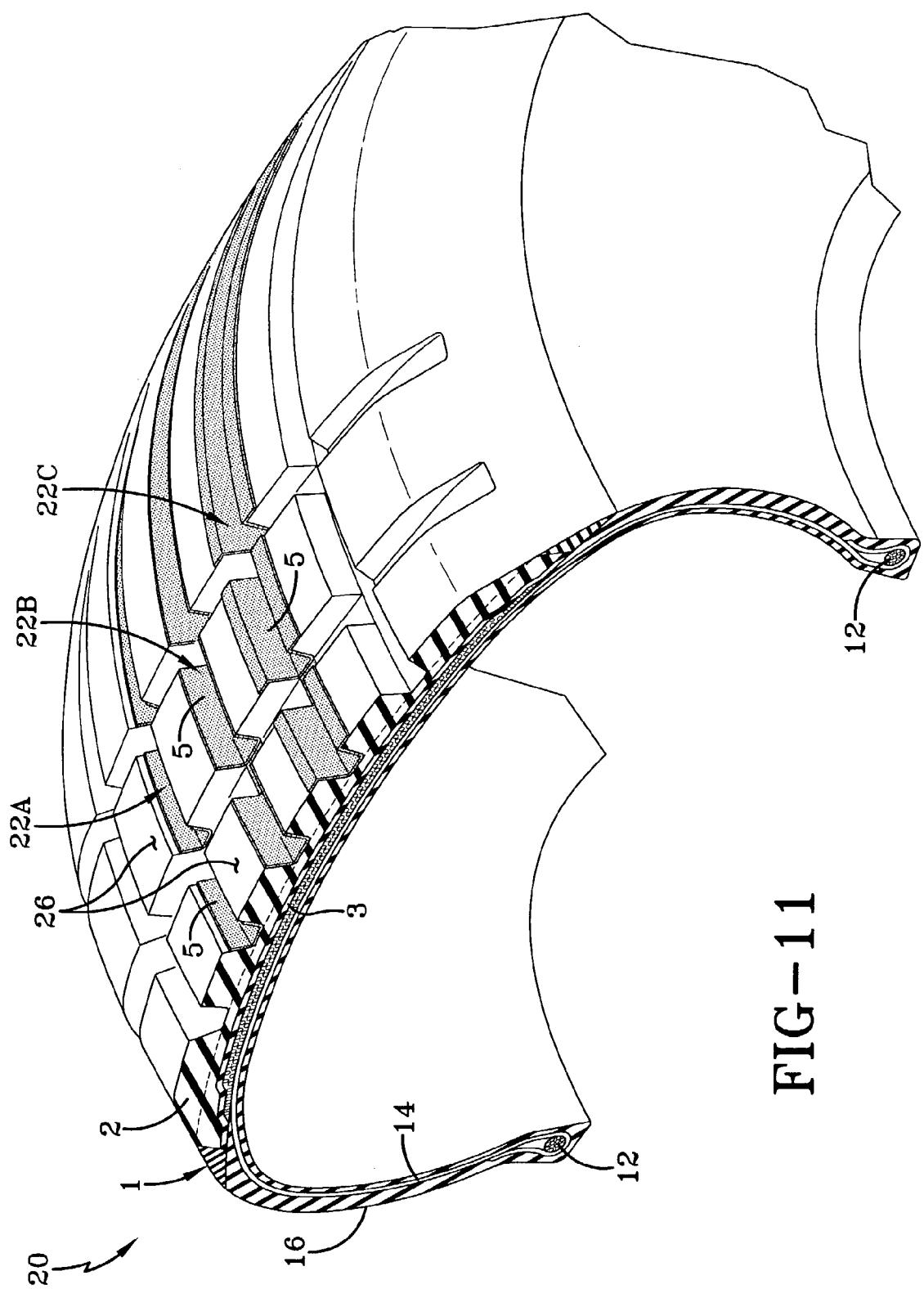
FIG. 11 is a perspective view depicting the tire tread of the assembly of FIG. 10, or of FIG. 10B after removal of the thermoformable film.
Figure 12:
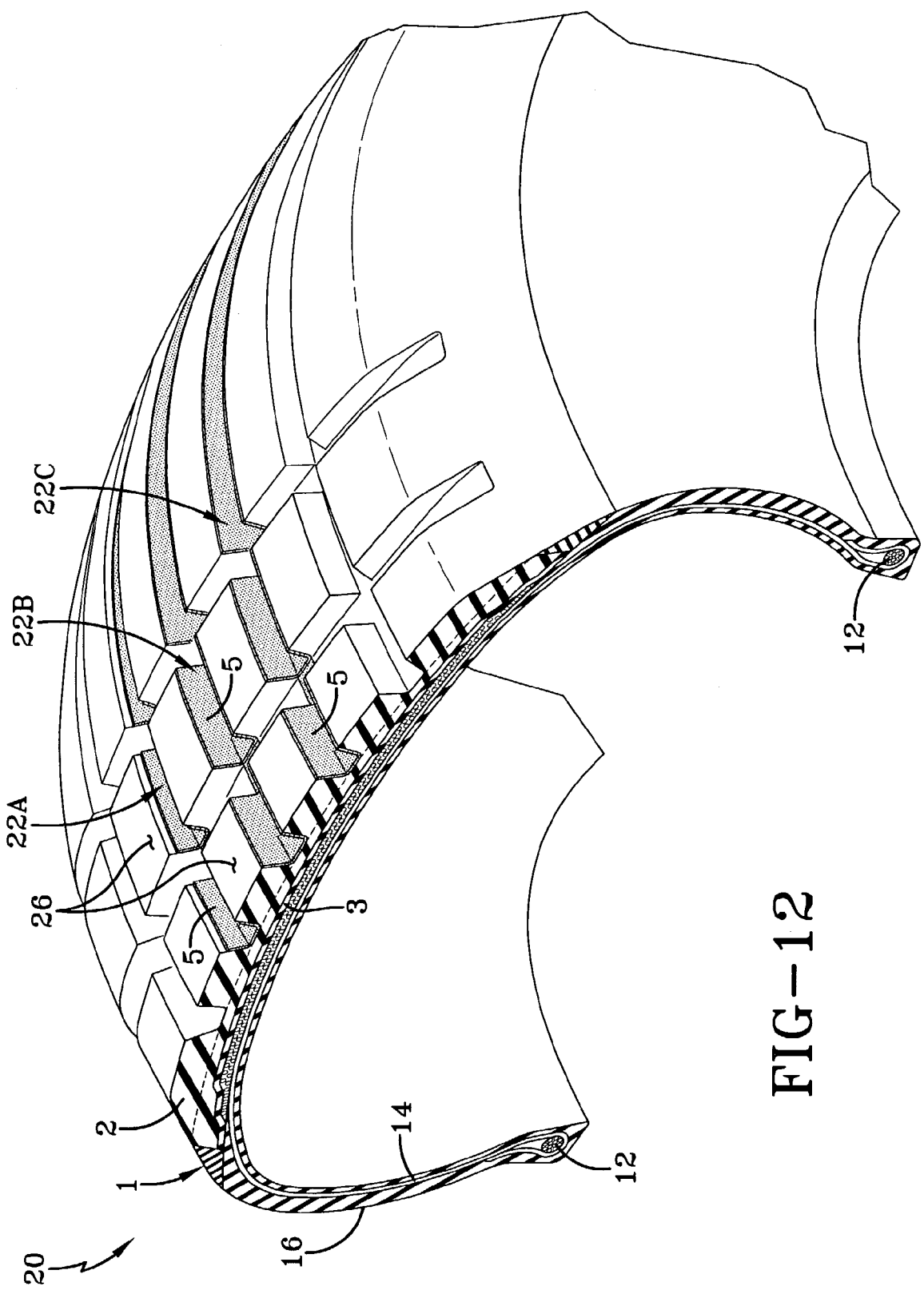
FIG. 12 is a perspective view depicting the tire tread after removal of the non-black component from any ground-contacting surfaces.

After the strips of non-black component 5 and thermoformable film 6, if desired, have been placed on the uncured tread strip 1, the pattern of grooves 22, 24 are formed in the uncured tread strip 1 of assembly 10. The strips of non-black component 5 conform to the recessed surfaces of the circumferential grooves 22, as shown in FIG. 10 and in enlarged cross-section in FIG. 10A. In this embodiment, strips of non-black component 5 were placed on the tread strip 1 so as to be formed into three of the five circumferential grooves 22. The strip of non-black component 5 placed in groove 22a covers a substantial portion of the recessed surface of groove 22a, but not the entire surface. "Substantial portion" may, for example, be at least one third of the recessed surface, with the main object being enough color in the groove for the color to be visible. Advantageously, the minimum width for a strip of non-black component 5 is about 0.5 in. The strip of non-black component 5 placed in groove 22b was sized and positioned perfectly so as to cover the entire recessed surface of groove 22b. The strip of non-black component 5 placed in groove 22c was oversized such that the non-black component 5 covers the entire portion of the recessed surface of groove 22c and extends onto the top surface 26 of tread strip 1. The placement of the non-black component 5 is further depicted in perspective view in FIG. 11. Those portions of the non-black component 5 that extend out of the grooves 22 onto the ground-contacting top surface 26 of the tread strip 1 are then removed from the surface 26, such as by buffing, to provide a tire assembly 20 as shown in FIG. 12 in which color is localized in at least a substantial portion of at least one tread groove, and the ground-contacting surface is essentially free of color.

The non-black component 5 may comprise a colored marking ink or a colored crosslinkable composition. The colored marking inks may be applied first to a releasable thermoformable film 6 to form a color transfer film 5, 6 that can be applied to the tread as a single component encompassing both non-black component 5 and thermoformable film 6. After shaping and curing, the thermoformable film may be removed to reveal the non-black component 5. For example, marking inks, such as DH-4912 yellow ink, DH-1611 white ink, DH-6677 blue ink or DH-2570 red ink, commercially available from Akron Paint and Varnish, Inc., Akron, Ohio, may be painted onto the thermoformable film, using a solvent that is subsequently evaporated. This solvent-less color transfer film 5, 6 can then be applied to the tread strip 1, such that no solvent is present during the tire assembly, shaping and curing to volatilize into the workplace. Alternatively, the ink may be applied directly to the tire tread strip 1, such as by brushing, spraying or painting, and dried in air, followed by placing the thermoformable film 6 over the dried ink. The ink may be applied prior to assembling the tread strip 1 to the carcass ply 14, for example, at the stage of tread extrusion, or it may be applied at the tire assembly machine. Alternatively, the non-black component 5 may be a colored crosslinkable composition. For example, the crosslinkable composition may comprise a natural rubber and/or at least one synthetic diene or isobutylene based elastomer or combinations thereof, a colored pigment, and a curing agent. A separate thermoformable film 6 may then be placed over the crosslinkable component 5 to prevent staining of the crosslinkable composition. These crosslinkable compositions, which may be referred to as colored rubber, may be calendered to provide a desired thickness, such as 40 mils thick, or less. In another alternative, the non-black component 5 may be a vulcanizable film composed of flexible, durable, exposed retroreflective sheeting, such as 3M® Scotchlite® 8150, commercially available from 3M, Brownwood, Tex. The Scotchlite® 8150 has an adhesive backing for placement onto the tire tread. The small glass beads within the Scotchlite® 8150 composition provide stain resistance from staining ingredients in the mold, such that the thermoformable film 6 may be eliminated when using Scotchlite® 8150 or other like material.

It may further be appreciated that not only can staining of the non-black component 5 occur from contamination in the mold, but staining may also occur by migration of aromatic oils or amines from the tread rubber up into the non-black component. The thinner the non-black component 5, the more likely it is that the staining from the tread will show through the visible surface of the colored groove. Thus, it may be desirable to provide a barrier coating (not shown) on the tread strip 1 prior to applying the non-black component 5. Such barrier coatings are known in the art with respect to manufacture of tires having decorative sidewalls, for example, a rubber barrier as disclosed in EP 0,249,918.

In an exemplary embodiment of the present invention, a thermoformable film 6 separates the non-black component 5 from the mold surface during the shaping and curing steps to prevent staining of the non-black component 5 caused by contamination in the mold. In order to conform to the groove pattern formed in the uncured tread, thermoformable film 6 should exhibit the property of necking, which refers to the ability of a material to stretch without returning back to its original shape. The film 6 advantageously exhibits necking in at least one direction, and preferably in both directions, usually referred to as the machine direction (MD) and cross direction (CD). The necking force, in accordance with room temperature testing at a cross-head speed of 20 in./min, is advantageously below about 25 lbf, and more advantageously below about 20 lbf, in at least one direction, and preferably in both directions, for a 1 inch wide strip. Non-oriented films are desirable, though partially oriented films may also be used. Further, the thermoformable film should exhibit a melting point greater than the curing temperature of the tire assembly. Advantageously, the thermoformable film 6 should also have the ability to stick to some extent to the non-black component 5, such that it does not shift or fall off before the shaping and curing processes, yet should be removable (releasable) from the non-black component 5 after curing. The thermoformable film should further have sufficient strength to be removed from non-black component 5 in a single piece for ease of manufacture. The thermoformable film 6 should advantageously be overlapped to form a pull tab 7, to facilitate easy removal of the film. Nylon 6 and nylon 6,6 films on the order of 0.75 mil to 2 mil thick may serve as exemplary thermoformable films in the present invention. Exemplary films include: Capran® Nylon, which is a multipurpose nylon 6 film commercially available from Honeywell, International, Pottsville, Pa.; fluorinated ethylenepropylene (FEP) films, such as Teflon®FEP fluorocarbon film from DuPont Films; 1-phenyl-3-methyl-5-pryrazolone (PMP) films, such as PMP Release Film from Honeywell; and C917 Dartek®, which is a nylon 6,6 film available from DuPont, Canada. Necking force, maximum tensile strength, % elongation and thickness for these exemplary films are provided below in Table 1. Thermoformable films that are non-oriented or only partially oriented and exhibit a necking force in both the machine direction and cross direction of less than 20 lbf are preferred in the present invention.

TABLE 1

| Sample* | Mil | Micro-m | Max Tensile | Necking lbf | Elongation |
|---|---|---|---|---|---|
| FEP (MD) | 1 | 25.4 | 22 | 2.25 | 393 |
| FEP (CD) | 1 | 25.4 | 23.5 | 2.6 | 272 |
| ½" FEP (MD) | 1 | 25.4 | 19.6 | 1.1 | 361 |
| PMP (MD) | 1 | 25.4 | 28 | 3.5 | 107 |
| PMP (CD) | 1 | 25.4 | 28 | 2.5 | 90 |
| C917 Dartek ®, (MD) | 2.0 | 50.8 | 173 | 11.5 | 202 |
| C917 Dartek ®, (CD) | 2.0 | 50.8 | 118 | 11.25 | 128 |
| C917 Dartek ®, (MD) | 0.75 | 19 | 48.9 | 4.5 | 90 |
| C917 Dartek ®, (CD) | 0.75 | 19 | 47.7 | 4.25 | 59 |
| Capran ® Nylon (MD) | 1 | 25.4 | 61 | 7 | 118 |
| Capran ® Nylon (CD) | 1 | 25.4 | 63 | 6 | 60 |

*1" wide unless otherwise indicated.

Experiments

Various simulated and actual tests were performed to demonstrate the present invention. Color transfer films were tested in which yellow, white, blue and red marking inks were sprayed onto a nylon 6,6 film, followed by drying in air to obtain approximately 3 mil dry coat thickness for the non-black component. Crosslinkable compositions were also tested using white and yellow non-staining rubber compounds calendered to 40 mil thickness.

Simulated Tread Build with and Without Thermoformable Film

A 4 in.×4 in.×4 in. mold was filled with a typical tread rubber compound. A 4 in.×4 in.×40 mil calendered yellow rubber compound was placed on the tread compound. A rectangular iron rod having a width of 1 in. and depth of 0.5 inch was placed on top of the calendered yellow compound. The assembly was cured at 300° F. for 28 minutes using 25 tons platen pressure. After cure, the rod was removed. The yellow color inside the simulated tread groove was highly stained. The same experiment was repeated, but using a nylon 6,6 film over the calendered yellow compound prior to placement of the iron rod. After cure, the yellow color inside the simulated tread groove exhibited no staining.

Tire Builds

Tire 1 was assembled by applying a calendered yellow compound of 40 mil thickness on the top of the tread strip at the tire building machine. A nylon film was placed over the calendered yellow compound. The assembly was subjected to initial inflation and deflation to test the materials, and the nylon film remained adhered during this initial testing. After shaping and curing, the nylon film was removed and the tread was buffed to remove the yellow color from the tread lugs, thereby localizing the yellow color in the tread grooves. The tire with localized yellow tread grooves was successfully built, but the tire did need significant buffing to remove the yellow compound from the lugs due to the 40 mil thickness.

Tire 2 was built by applying a calendered white compound on top of the tread strip at the tire building machine. A glow-in-the-dark pigment was mixed with stearic acid (3:1 ratio) and applied to the white compound, followed by nylon 6,6 application. After shaping and curing, the nylon film was removed and the tread was buffed so that the glow-in-the-dark color remained only in the tread grooves. Again, the tire was successfully built, but the lugs needed extensive buffing due to the 40 mil thickness of the calendered compound.

Tire 3 was built by applying red and blue color transfer nylon films (discussed above) to the top of the tread strip at the tire building machine. The assembly was subjected to initial inflation and deflation testing, and the nylon film remained adhered. After shaping and curing, the nylon film was removed and the tread lugs were slightly buffed to localize the red and blue color only in the tread grooves. The tire having red and blue grooves was successfully built, and very little buffing was needed due to the thin 3 mil thickness of the non-black component.

Tire 4 was built by applying four thin 3M® Scotchlite® 8150 reflective sheets near the tread groove area away from the tire building machine, followed by wrapping the tread strip with nylon film. The tread strip was then added to the tire assembly at the tire building machine, and after shaping and curing, the nylon film was removed. The four reflective sheets were centered approximately in the tread grooves without the need for buffing.

Tire 5 was built by applying blue, yellow and red inks to the uncured tire in a pattern to perfectly correspond to the grooves to be formed, away from the tire building machine, followed by drying in air. The tread strip was then assembled to the carcass ply and the outside of the tread was then wrapped with nylon film so that part of the nylon film is overlapped. After shaping and curing, the nylon film was removed easily because the overlapped portion formed a pull tab. The colored markings were approximately centered inside the tread grooves and the tread lugs needed very little buffing.

Tire 6 was built by applying two different width strips (0.5 in. and 0.75 in.) of 3M® Scotchlite® 8150 reflective sheets on the uncured tire tread at the tire building machine positioned to center the strips in the grooves to be formed. The goal was to have the reflective material reach up the walls of the grooves, but not to the top of the lug, thereby eliminating the need for buffing. No nylon film was used. The reflective strips had an adequate tack to remain in place prior to shaping and curing. After shaping and curing, the reflective sheet remained clean despite the absence of the nylon protective film. Tire 6 was tested on an outdoor resiliometer for 30K miles. Over time, the reflective sheet darkened due to migration of staining ingredients from the tread rubber. However, even after darkening, the light reflectivity remained acceptable.

The above experiments indicate that the non-black component may be applied as a color transfer film comprising a color ink on a thermoformable film, or as a rubber compound, or by painting, spraying or brushing an ink onto the tread. The non-black component is advantageously covered with a thermoformable film, preferably nylon 6,6, to prevent staining of the non-black component by the mold. The non-black component may be applied to the tread either before assembling the tread at the tire building machine or after assembly of the tread. The thermoformable film is preferably applied at the tire building machine or thereafter. If applied before assembly, the thermoformable film may go in between the tread splice, which is undesirable. After shaping and curing, buffing is performed as necessary to remove any non-black component from the lugs of the tread. Migration of staining ingredients from the tread rubber into the non-black component over time may be reduced or eliminated by replacing the staining ingredients in the tread compound with non-staining ingredients, or by using a barrier coating between the tread and the non-black component. Thus, in accordance with the present invention, tires may be manufactured having color localized in the tread grooves and absent from the lug surface of the tread which is designed to be ground-contacting such that color transfer to the ground does not occur.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

The invention claimed is:

1. A method of making a pneumatic tire comprising a black colored tread strip having a top surface designed to be ground-contacting and a pattern of non-black recessed grooves therein, wherein at least a substantial portion of at least one recessed groove is non-black, the method comprising:

building an uncured tire assembly having a black colored, uncured tread strip;

placing a non-black component over at least a portion of an outer surface of the uncured tread strip;

placing the uncured tire assembly in a mold and forming a pattern of recessed grooves in the outer surface of the uncured tread strip whereby the non-black component conforms to the pattern;

curing the tire assembly; and removing any non-black component from the top surface designed to be ground-contacting, wherein the non-black component consists of an ink, the method further comprising first positioning the ink on a thermoformable film to form a color transfer film prior to placing the non-black component over the uncured tread strip, and after curing, removing the film thereby leaving the non-black component on the outer surface.

2. The method of claim 1 wherein the non-black component comprises a plurality of strips, the method comprising placing the strips over the portions of the outer surface in a pattern corresponding to the pattern of non-black recessed grooves to be formed.

3. The method of claim 1 wherein the thermoformable film is a nylon film.

4. The method of claim 1 further comprising applying a barrier coating to the outer surface prior to placing the non-black component on the outer surface, wherein the barrier coating aids in preventing transfer of black color from the black colored tread strip to the non-black component.

5. The method of claim 1 wherein the thermoformable film is placed around the outer surface so as to have overlapping end portions with one end forming a pull tab.

6. The method of claim 1 wherein the thermoformable film is a non-oriented nylon film.

7. The method of claim 6 wherein the thermoformable film exhibits a necking force in a machine direction and a cross direction of less than about 20 lbf for a 1 inch wide strip.

* * * * *